United States Patent [19]
Sanbonmatsu et al.

[11] Patent Number: 5,711,645
[45] Date of Patent: Jan. 27, 1998

[54] CONNECTING CLIP FOR TOILET SEAT

[75] Inventors: Tohru Sanbonmatsu, Toyota; Masataka Mizutani, Tokoname; Nobuyuki Tanaka, Tokoname; Akira Takamata, Tokoname; Shuniti Teranisi, Anjo; Atsushi Sawaki, Chita-gun, all of Japan

[73] Assignees: NIFCO, Inc.; INAX Corporation; Aisin Seiki Kabushiki Kaisha, all of, Japan

[21] Appl. No.: 663,429

[22] Filed: Apr. 1, 1996

[30] Foreign Application Priority Data

Mar. 31, 1995 [JP] Japan ................... 7-097536
Mar. 27, 1996 [JP] Japan ................... 8-097613

[51] Int. Cl.⁶ ............................................. F16B 37/08
[52] U.S. Cl. ...................... 411/270; 411/267; 411/433; 411/437
[58] Field of Search ...................... 411/267, 270, 411/433, 437

[56] References Cited

U.S. PATENT DOCUMENTS

| | | | |
|---|---|---|---|
| 4,657,458 | 4/1987 | Woller et al. | 411/437 |
| 4,930,961 | 6/1990 | Weis | 411/267 |
| 5,027,671 | 7/1991 | Erikson et al. | 411/270 |
| 5,039,266 | 8/1991 | Nagayoshi et al. | 411/433 |

FOREIGN PATENT DOCUMENTS

| | | | |
|---|---|---|---|
| 2508994 | 1/1983 | France | 411/433 |
| 2640336 | 6/1990 | France | 411/267 |
| 2650351 | 2/1991 | France | 411/267 |
| 59-64100 | 4/1984 | Japan . | |

*Primary Examiner*—Steven N. Meyers
*Assistant Examiner*—Robert G. Santos
*Attorney, Agent, or Firm*—Parkhurst & Wendel

[57] ABSTRACT

A connecting clip for a toilet seat, including a nut and an operating member mounted thereon. The nut includes a plurality of semicylinders that are connected to each other, and which have inner peripheral surfaces that together define a female screw portion, whereby the nut can be screwed onto a bolt. The nut further includes engaging members provided at one longitudinal end thereof to connect the plurality of semicylinders together, the opposite longitudinal end including a connecting portion, such as a hinge member. The operating member engages the nut and is movable between first and second positions, wherein in the first position the semicylinders are compressed such that the nut is adapted to threadingly engage the bolt on which it is to be mounted. In the second position of the operating member, the semicylinders are allowed to spread apart from one another such that the nut no longer threadingly engages the bolt. In this position, the nut may be moved axially along the bolt.

31 Claims, 16 Drawing Sheets

F I G. 6
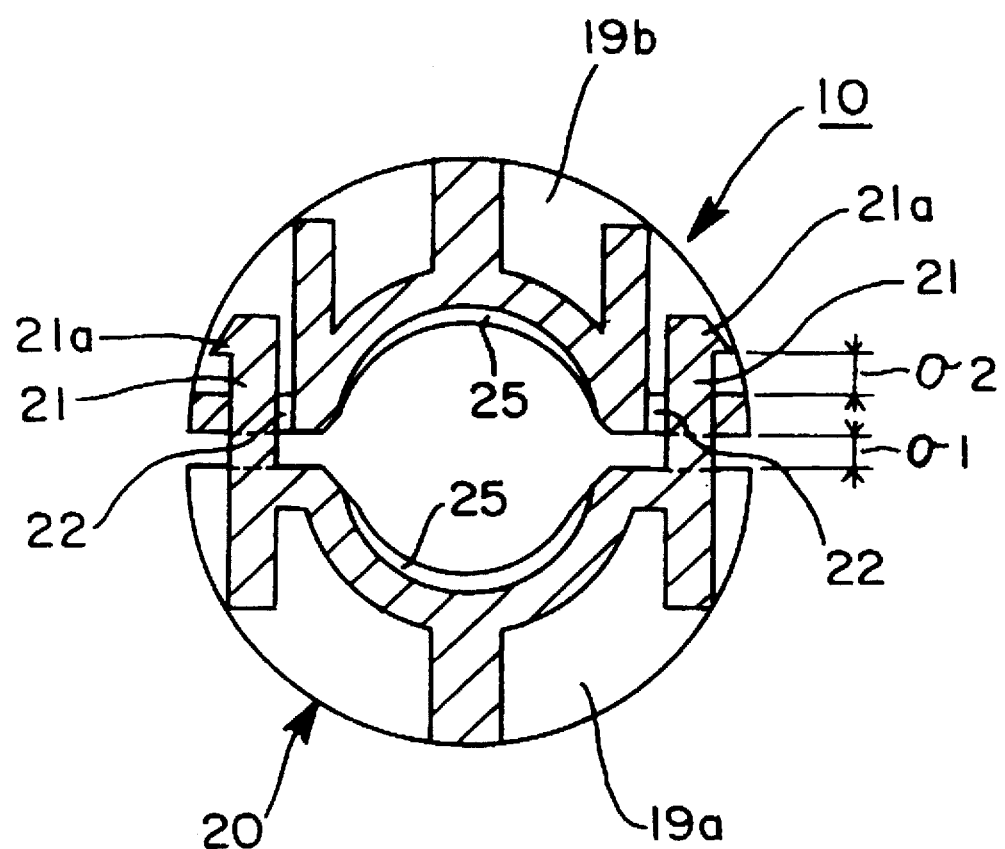

5,711,645

1

CONNECTING CLIP FOR TOILET SEAT

BACKGROUND OF THE INVENTION

1. Field of the Invention

The present invention relates to a connecting clip for a toilet seat, which is used when a toilet seat is mounted to a toilet stool, or the like.

2. Description of the Related Art

Recently, a toilet seat having various functions such as heating, washing, drying, and the like, has been used for a Western-style toilet stool. It is demanded that this kind of toilet seat be easily removed at the time of maintenance and inspection, cleaning, or the like. In order to meet this demand, a large number of methods have been conventionally proposed which allow easy mounting and removal of a toilet seat without using a special tool. One method is, for example, disclosed in Japanese Utility Model Application Laid-Open (JP-U) No. 59-64100.

FIG. 20 shows a conventional example of a toilet stool with a toilet seat being mounted thereto and the method shown therein is the same as that disclosed in the above-described JP-U No. 59-64100. As illustrated in FIG. 20, in order to mount a toilet seat 101 to a toilet stool 102, a connecting tool 50 is used between the seat 101 and the toilet stool 102.

FIGS. 21 and 22 show details of the connecting tool 50. A shaft portion 51a of a bolt 51 is provided to pass through a case 53 of the seat 101 and a bolt-inserting through hole 103 of the toilet stool 102 from an upper side and a ring-shaped rubber packing 52 and a ring-shaped pressing plate 63 are placed on the bolt shaft portion 51a from the lower side thereof, and thereafter, a nut 54 is screwed onto the shaft portion 51a so as to fix the rubber packing 52 and the pressing plate 63 to the bolt shaft portion 51a. Bosses 55 are respectively provided so as to project from both sides of the nut 54 and deadlock tools 56 are mounted in such a manner as to hold the nut 54 therebetween via the bosses 55.

A cam surface 56a is formed at one end of the above-described deadlock tool 56 so as to be located a dimension a from the bosses 55. An operating lever portion 56b is formed at another end of the deadlock tool 56. Further, the dimension of the cam surface 56a is set such that the relationship between the cam surface 56a and the center of a boss hole in which the boss 55 is fitted is represented as an expression, a<b<c (see FIG. 21).

First, as shown in FIG. 21, when the nut 54 is tightened with the deadlock tool 56 disposed in a vertical position (i.e., a position in which the longitudinal direction of the deadlock tool 56 coincides with the vertical direction), the deadlock tool 56 gradually compresses the rubber packing 52 while the cam surface 56a pushes up the pressing plate 63. Subsequently, as shown in FIG. 22, when the deadlock tool 56 is pivoted to a horizontal position (i.e., a position in which the longitudinal direction of the deadlock tool 56 coincides with the horizontal direction), the pressing plate 63 is further pushed up by dimension d which is a difference between dimensions a and c (a<c) and the rubber packing 52 is applied to the lower surface of the toilet stool 102 with pressure, so that the case 53 can be securely connected to the toilet stool 102.

Accordingly, in the structure using the deadlock tool 56, the seat 101 can be mounted to the toilet stool 102 via the case 53 of the toilet seat 101.

However, with the above-described conventional structure, in order to mount the seat to the toilet stool, a final

2 fastening operation of pivoting the deadlock tool 56 needs be performed after the nut 54, to which the deadlock tool 56 is fixed, has been rotated and moved to a predetermined position. Further, in order to remove the seat from the toilet stool, it is necessary that the nut 54 be released from being fastened by the deadlock tool 56, the nut 54 to which the deadlock tool 56 is fixed be rotated and moved to a predetermined position, the nut 54 be removed from the bolt 51, and the seat 101 together with the case 53 be removed from the toilet stool 102. Thus, a lot of time is required to mount and remove the seat to and from the toilet stool. For this reason, there is a drawback in that mounting and removal of the seat is difficult at the time of maintenance and inspection, cleaning or the like.

SUMMARY OF THE INVENTION

In view of the above-described circumstances, it is an object of the present invention to provide a connecting clip for a toilet seat, which can securely connect a toilet seat to a toilet stool in a simple manner without using a tool even in a small space.

Other objects of the present invention will become apparent in the description which will be given later.

The present invention is a connecting clip for a toilet seat, comprising: a nut formed by a plurality of semicylinders which are connected and each of which has, on an inner peripheral surface of the semicylinder, a female screw portion which can be screwed into a bolt; and an operating member mounted on an outer periphery of the nut and provided to be engaged with the nut at a first position and a second position, the first position being provided in that the plurality of semicylinders approach together toward an axial center of the nut and the operating member moves to a position at which the nut is screwed into the bolt so as to reduce an inner diameter of the nut and the second position being provided in that the plurality of semicylinders are separated from one another to move away from the axial center of the nut and the operating member is moved to a position at which engagement of the nut and the bolt is released so as to enlarge the inner diameter of the nut.

In accordance with the present invention, after the nut formed by the plurality of semicylinders has been disposed, together with the operating member, at a predetermined axial-directional position of the bolt, only if the operating member is moved from the second position to the first position, the nut can be screwed into the bolt. Further, when the nut is tightened by being rotated together with the operating member, the seat can be securely connected to the toilet stool by screw fastening. Moreover, when the operating member is moved from the first position to the second position, the connected state by the connecting clip is released and it is possible to release the toilet stool and the seat from being connected to each other.

As described above, the connecting clip for a toilet seat according to the present invention has the following effects. That is, the operating member (i.e., knob) is mounted to the nut and the semicylinders which form the nut are disposed at the second position, namely, a predetermined position on the bolt shaft portion in a state in which the inner diameter of each of the semicylinders is enlarged until the semicylinders reach a position at which engagement of the nut and the bolt is released. Thereafter, when the operating member is moved to shift the nut to the first position, respective inner diameters of the semicylinders are reduced and respective female screw portions formed on the internal surfaces of the semicylinders are screwed into the bolt shaft portion, so that the operating member can be engaged with and fixed to the nut at the first position.

Accordingly, with the arrangement in which an overall length of the bolt shaft portion (male screw portion) is made longer and the nut is engaged with and fixed to the bolt shaft portion at a position which is apart from the end of the bolt shaft portion, after the nut at the second position is disposed, in such a manner as not to be screwed into the bolt, on the bolt shaft portion at a position near that where the operating member is finally to be engaged with and fixed to the nut, the nut can be screwed into the bolt with the operating member being moved to shift the nut to the first position. As a result, it is possible to limit a troublesome operation of moving the nut In the state of being screwed into the bolt shaft portion to a minimum, thereby substantially improving the operating efficiency.

Further, since the movement of the nut in the screwed state can be limited to a minimum, it is possible to securely mount the seat to the toilet stool in a simple manner without using a tool even in a small space.

BRIEF DESCRIPTION OF THE DRAWINGS

FIG. 6 is a schematic cross-sectional view taken along the lines 6—6 in FIG. 5.

DESCRIPTION OF THE PREFERRED EMBODIMENTS

Figure 16:
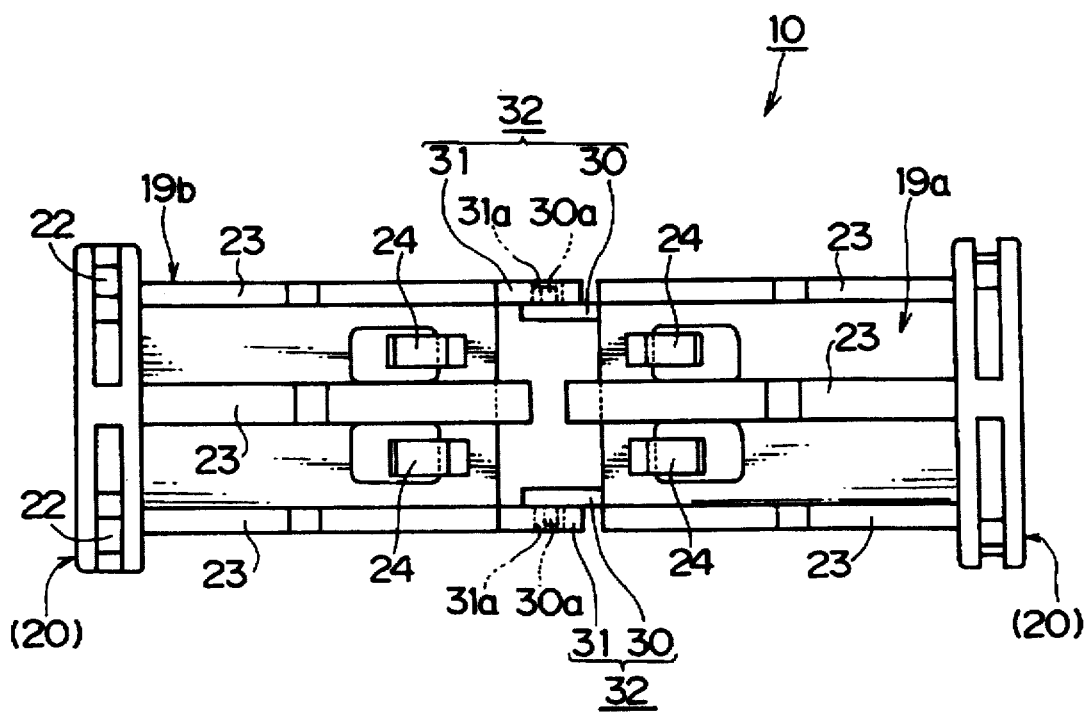
FIG. 16 is a developed side view illustrating another example of the above-described nut in a manner similar to FIG. 8.

Referring now to the attached drawings, an embodiment of the present invention will be described in detail. It should be noted that FIGS. 1 through 15 each show a first embodiment of the present invention; FIG. 16 shows another example of a nut which forms a connecting clip; and FIGS. 17 through 19 each show another example of a knob (i.e., operating member) which forms the connecting clip.

Figure 2:
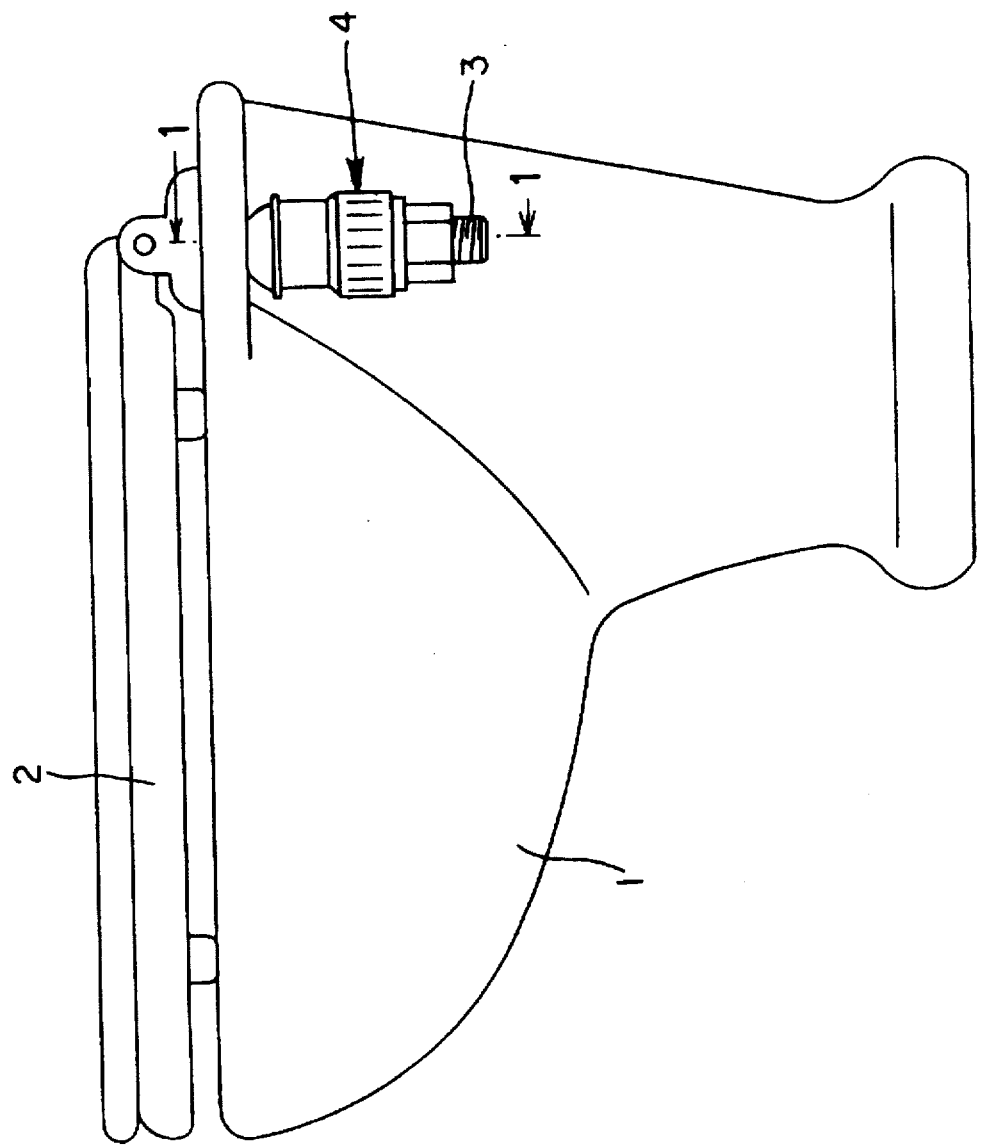
FIG. 2 is a side view of a toilet stool to which an embodiment of the present invention is applied.

FIG. 2 is a side view showing an example of a toilet stool to which a toilet seat is mounted by using a connecting tool to which the present invention is applied. In order to mount a toilet seat 2 having various functions such as heating, washing, drying and the like, to a toilet stool 1, a bolt 3 and a connecting tool 4 are used which are disposed between the toilet stool 1 and the seat 2.

Figure 1:
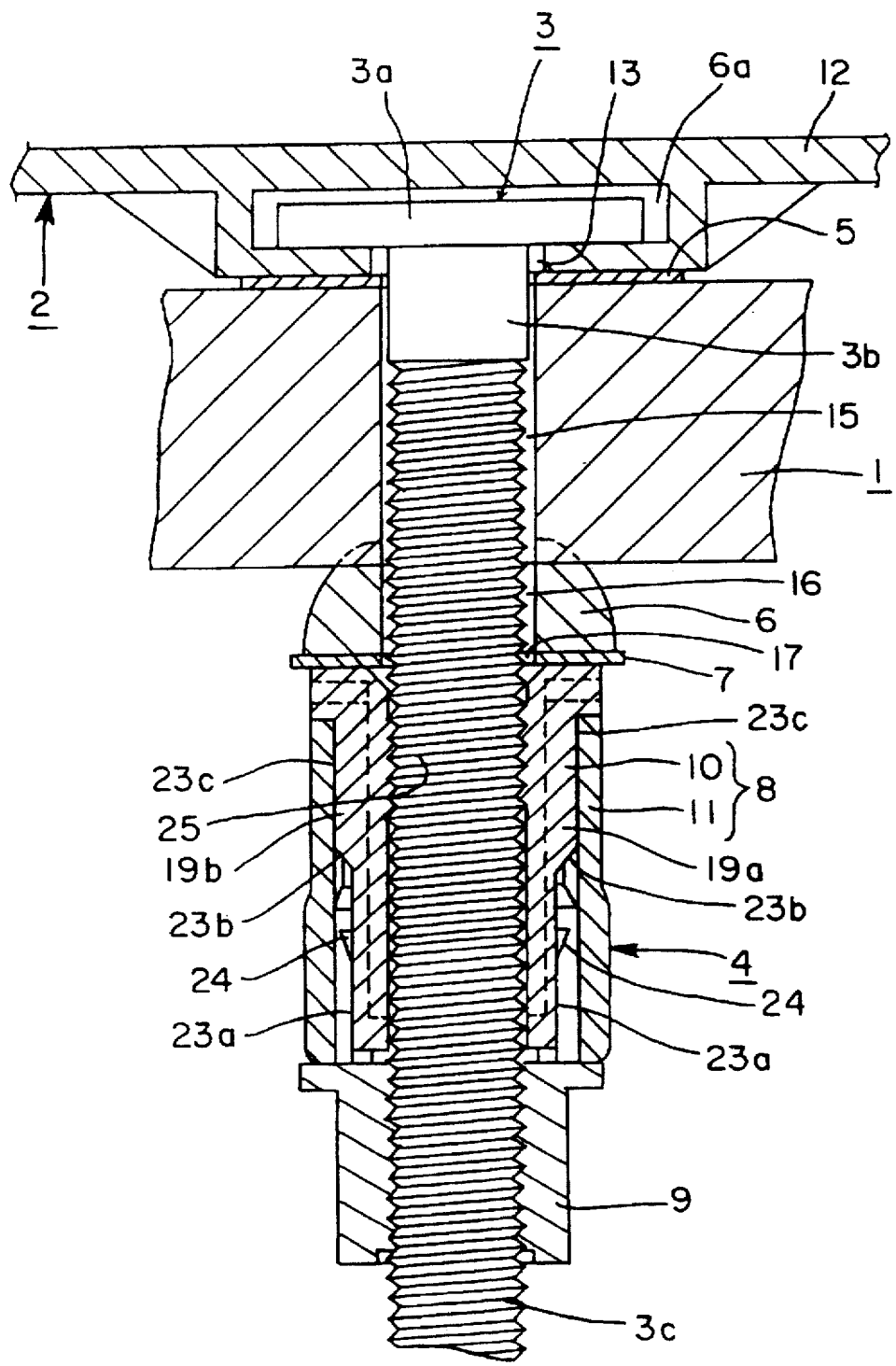
FIG. 1 is an enlarged cross-sectional view taken along the lines 1—1 in FIG. 2.
Figure 3:
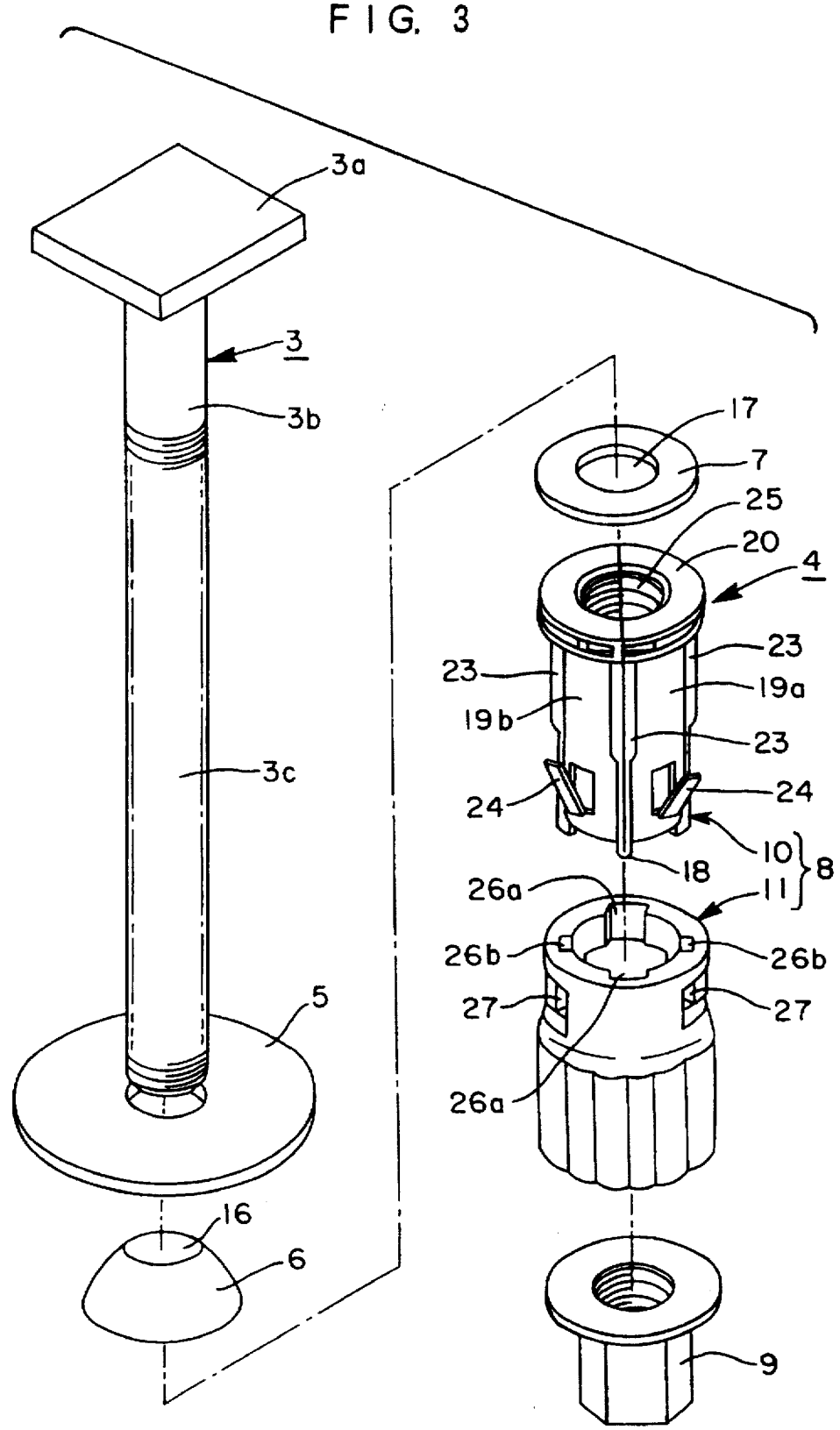
FIG. 3 is an exploded perspective view of a principal portion of a connecting tool to which the present invention is applied.

FIG. 1 is an enlarged cross-sectional view of the connecting tool 4 taken along the lines 1—1 in FIG. 2 and FIG. 3 is an exploded perspective view of a principal portion of the connecting tool 4. As shown in these figures, the connecting tool 4 is schematically formed by the above-described bolt 3, a rubber washer 5, a rubber bush 6, a resin washer 7, a connecting clip 8, a nut 9, and the like. The connecting clip 8 includes a nut 10 and a knob 11.

Further, the bolt 3 includes a head portion 3a and a shaft portion 3b, and screw threads 3c are formed along the shaft portion 3b. An engaging chamber 6a is provided in a case 12 disposed at the seat 2 side and includes a bolt slit 13 through which the shaft portion 3b of the bolt 3 passes.

The seat 2 and the bolt 3 are integrated with each other in such a manner that the shaft portion 3b is passed into the bolt slit 13 and the head portion 3a is inserted into the engaging chamber 6a, and the ring-shaped rubber washer 5 passes through the shaft portion 3b and is disposed at the lower surface of the engaging chamber 6a. Thereafter, the shaft portion 3b of the bolt 3 is inserted into a bolt-inserting through hole 15 of the toilet stool 1. When the bolt 3 is inserted into the bolt-inserting through hole 15 of the toilet stool 1, a lower end of the shaft portion 3b projects from a lower side of the toilet stool 1.

The rubber bush 6 has a semispheric configuration and includes, at the center thereof, a hole 16 through which the shaft portion 3b of the bolt 3 can pass. The resin washer 7 is disposed at a lower side of the rubber bush 6 and includes a hole 17 at the center of the resin washer 7 so that the shaft portion 3b of the bolt 3 passes through the hole 17.

Figure 4:
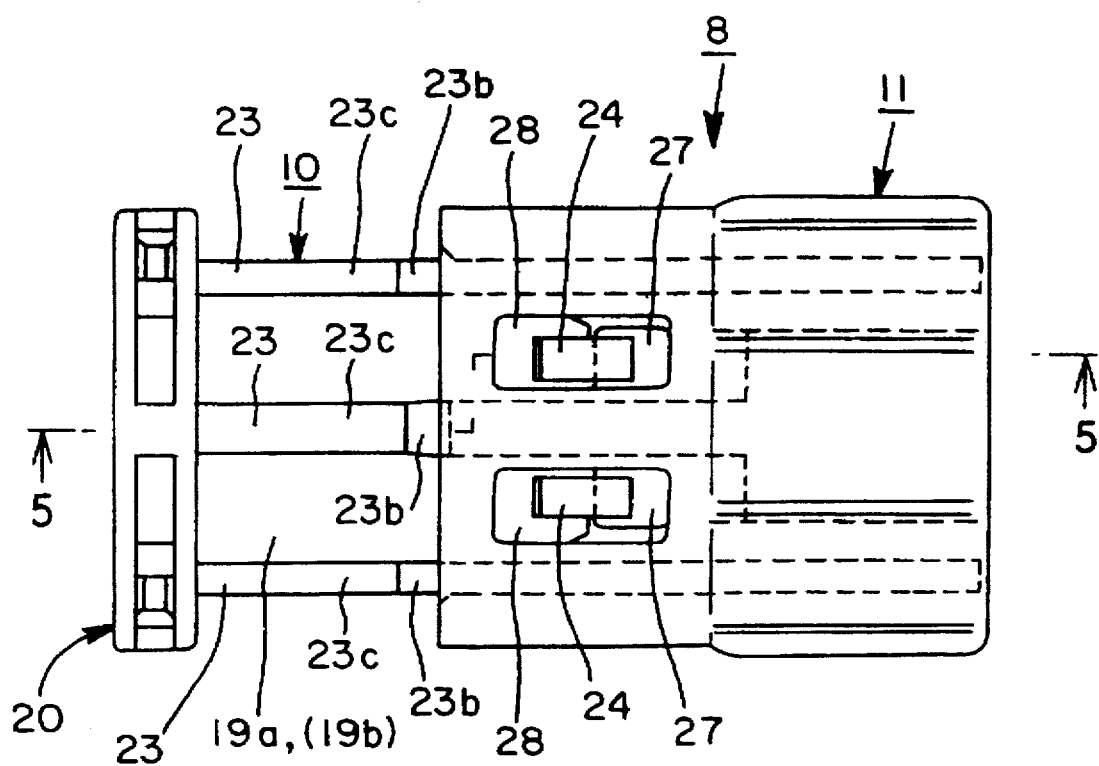
FIG. 4 is a side view of a connecting clip according to the embodiment of the present invention.
Figure 5:
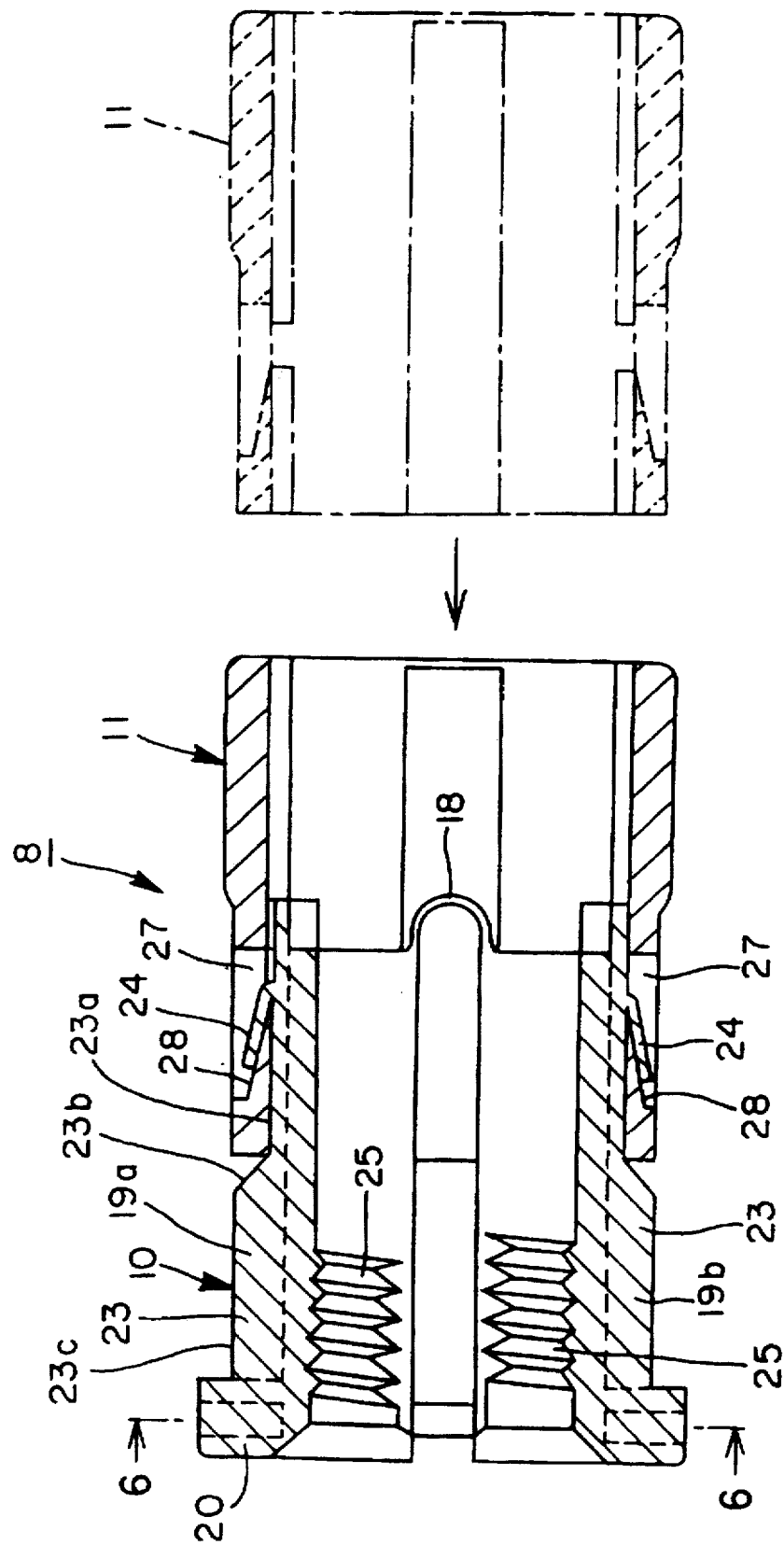
FIG. 5 is a cross-sectional view taken along the lines 5—5 in FIG. 4.

The connecting clip 8 has a unitary construction in which the nut 10 and the knob 11 serving as an operating member are combined. FIG. 4 shows a side view of the connecting clip 8 and FIG. 5 shows a cross-sectional view taken along the lines 5—5 in FIG. 4.

Figure 7:
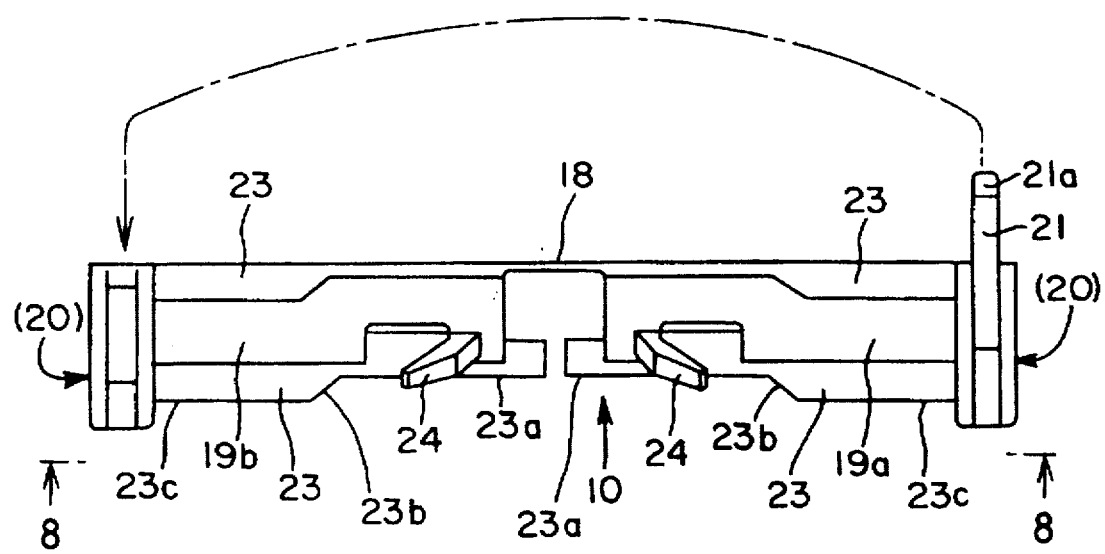
FIG. 7 is a side view illustrating a state in which a nut used in the embodiment of the present invention is developed.
Figure 8:
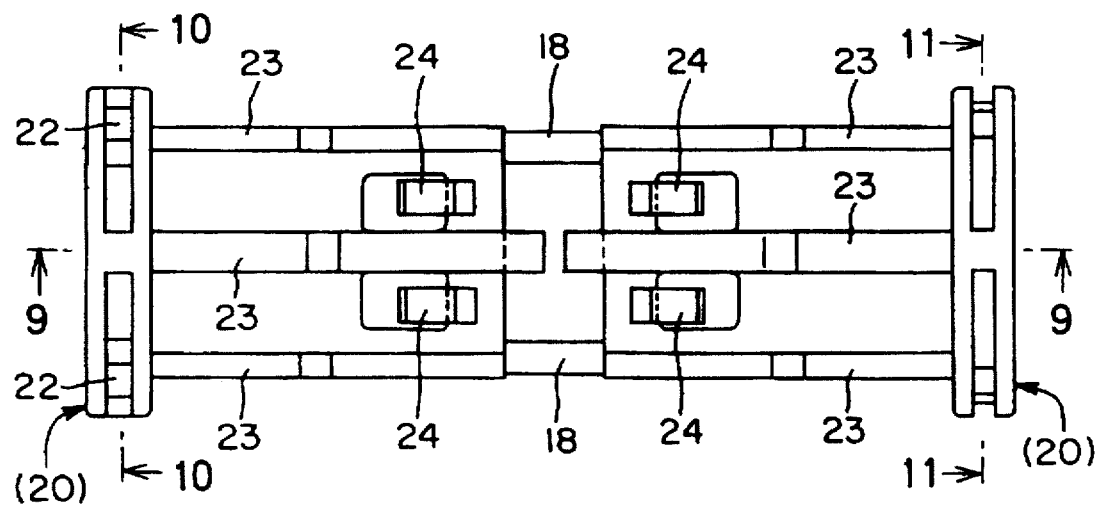
FIG. 8 is a developed side view of the above-described nut when seen from the direction along the lines 8—8 in FIG. 7.
Figure 9:
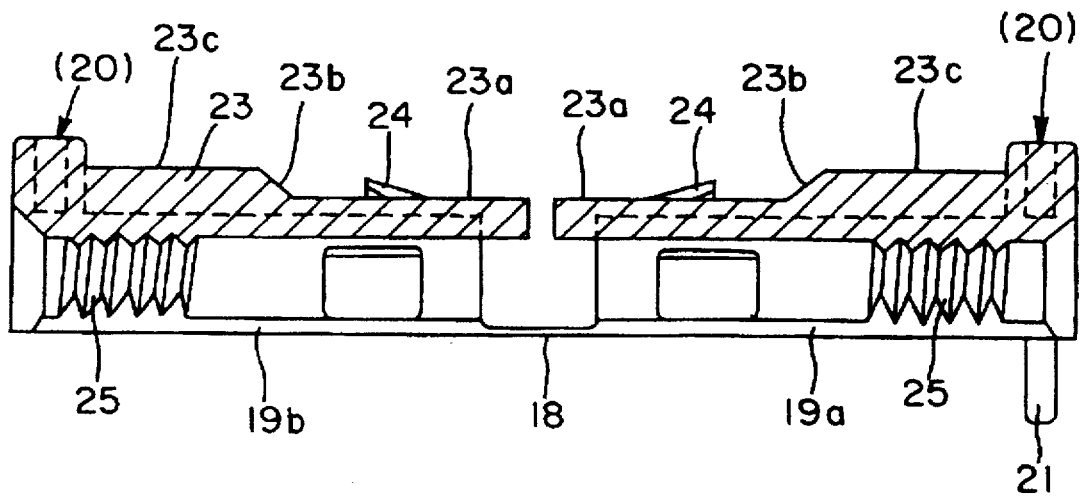
FIG. 9 is a cross-sectional view of the above-described nut when seen from the direction along the lines 9—9 in FIG. 8.
Figure 10:
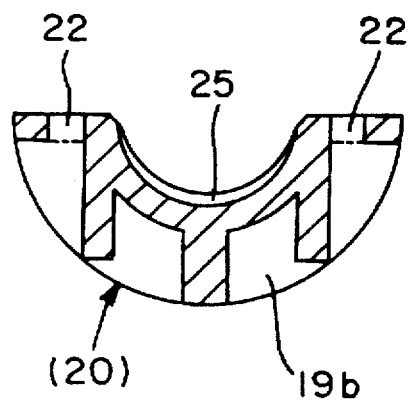
FIG. 10 is a cross-sectional view taken along the lines 10—10 in FIG. 8.
Figure 11:
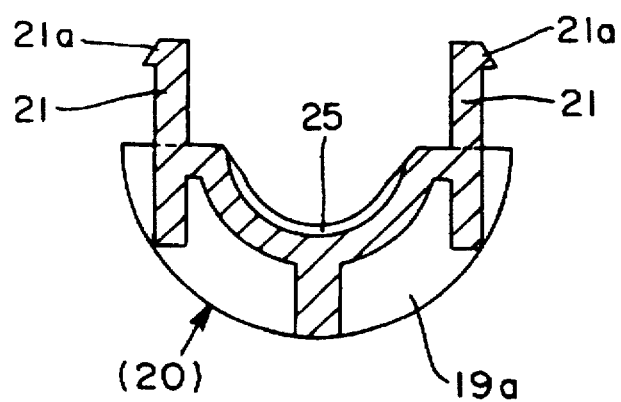
FIG. 11 is a cross-sectional view taken along the lines 11—11 in FIG. 8.
Figure 12:
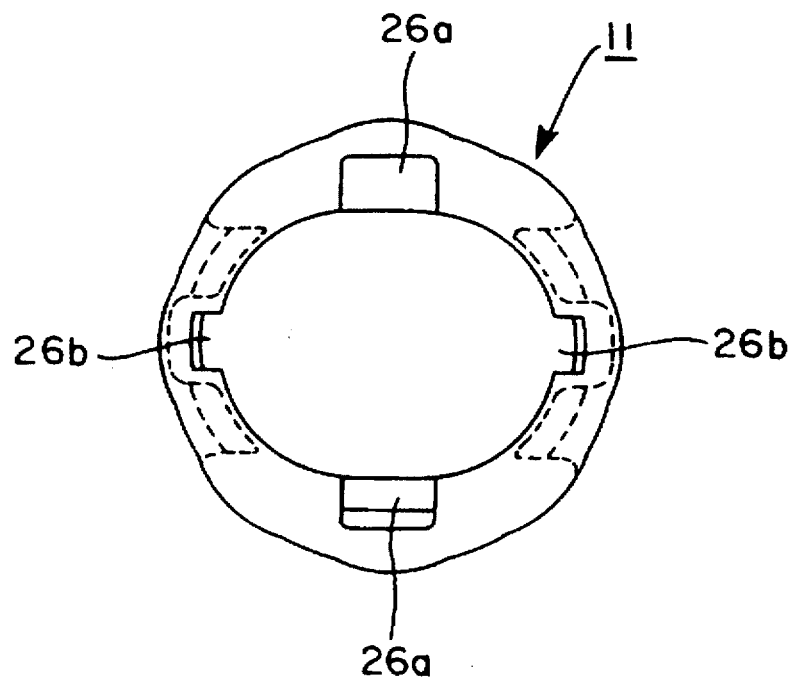
FIG. 12 is a top plan view illustrating, as a single body, a knob used in the embodiment of the present invention.
Figure 13:
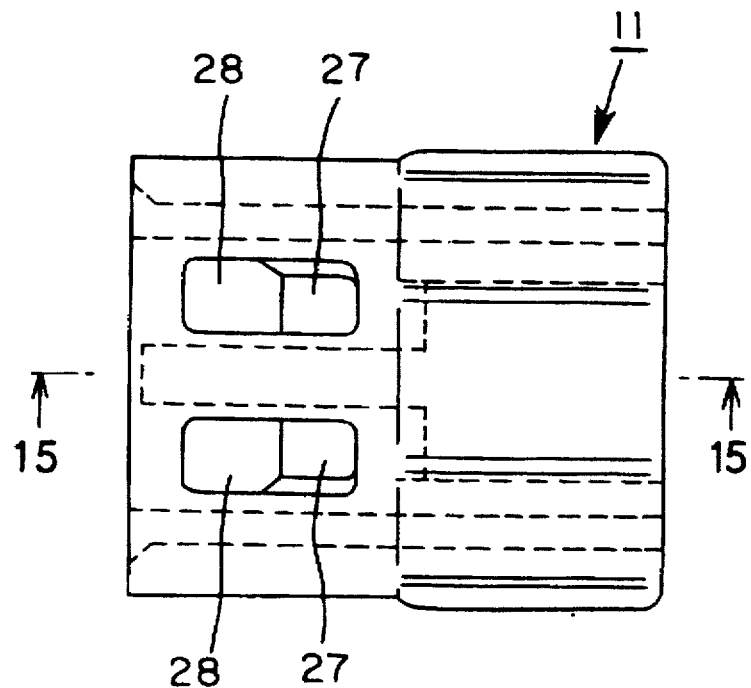
FIG. 13 is a side view illustrating, as a single body, the knob used in the embodiment of the present invention.
Figure 14:
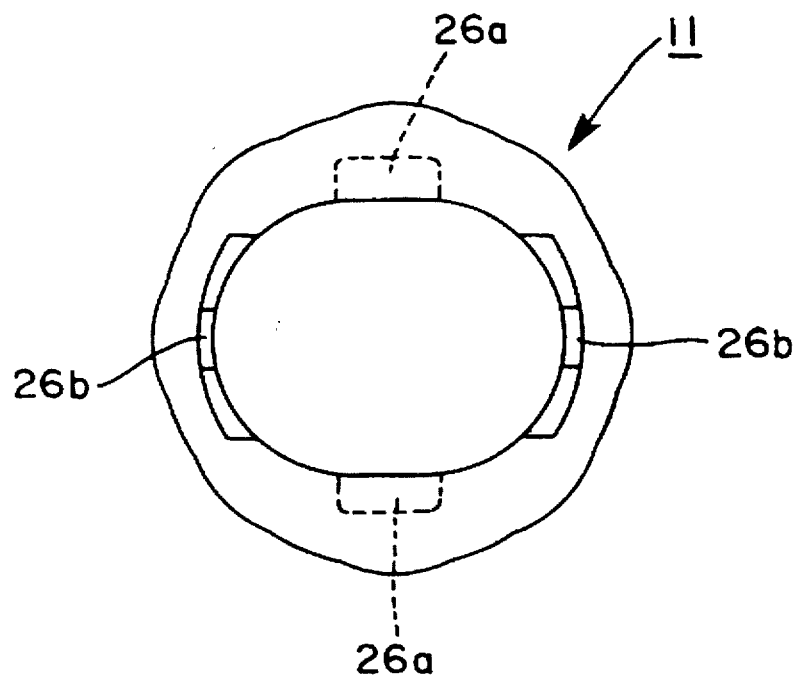
FIG. 14 is a bottom plan view illustrating, as a single body, the knob used in the embodiment of the present invention.
Figure 15:
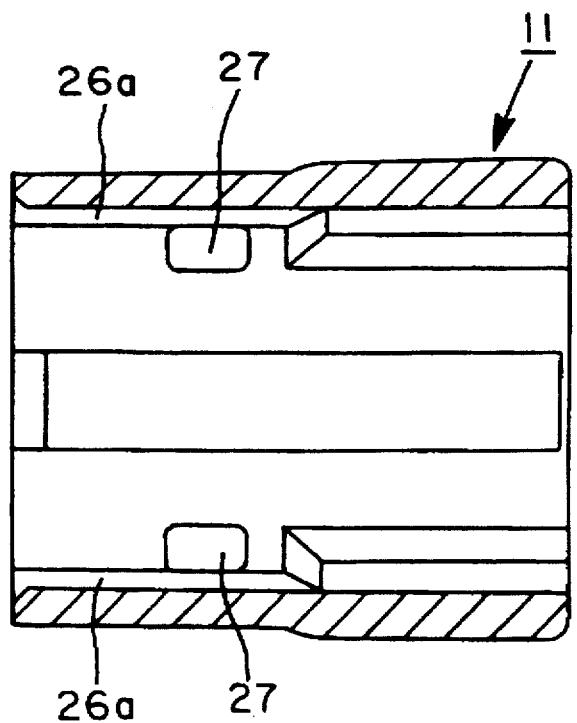
FIG. 15 is a schematic cross-sectional view taken along the lines 15—15 in FIG. 13.

First, a description will be given of the structure of the nut 10. The nut 10 is made of resin and includes a pair of semicylinders 19a, 19b which are connected by a pair of thin-walled and band-shaped flexible members 18. At the time of molding of the nut 10, the pair of semicylinders 19a, 19b are provided in an unfolded state as shown in FIGS. 7 through 9. After the nut 10 has been molded, the pair of semicylinders 19a, 19b provided in an unfolded state is folded at a position of the flexible member 18 which serves as a thin-walled hinge and are closely applied to each other to form a cylindrical configuration. Further, the nut 10 includes a flange portion 20 at the side thereof opposite to that in which the flexible member 18 is formed, and the flange portion 20 is formed when the pair of semicylinders 19a, 19b forms the cylindrical configuration. Engaging members 21 (see FIGS. 6, 8 and 11) each having an engaging claw 21a at an end thereof are provided in one semicylinder 19a so as to correspond to the flange portion 20, while the engaging members 21 are inserted into the other semicylinder 19b with pressure and engaging holes 22 (see FIGS. 6, 8 and 11) are formed in the semicylinder 19b. The engaging hole 22 is provided in which the engaging claw 21a is engaged therewith so as not to come out of the hole. Thus, the pair of semicylinders 19a, 19b which are folded at the position of the flexible member 18 can be maintained substantially in the shape of a cylinder with the engaging members 21 being inserted in the engaging holes 22. FIG. 3 (and FIGS. 4, 5 and 6) shows the state of the pair of semicylinders 19a, 19b after having been engaged with each other.

In the state of the pair of semicylinders 19a, 19b after having been engaged with each other, since the engaging member 21 has an excess portion having a certain length, a relatively large clearance "σ1+σ2" (see FIG. 6) can be formed between the pair of semicylinders 19a, 19b even after the engaging claw 21a has passed through the engaging hole 22.

Striped wall portions 23 are formed on an outer peripheral surface of each of the pair of semicylinders 19a, 19b at intervals of approximately 90 degrees in the circumferential direction of the semicylinder, in such a manner as to extend in the longitudinal direction of the semicylinder. As shown in FIG. 5, a portion 23a of the wall portion 23 at the side where the flexible member 18 is formed (in the present embodiment, the portion 23a will be hereinafter referred to as "proximal lower end portion 23a") is made low. An inclined surface is formed in a substantially intermediate portion 23b of the wall portion 23 (which will be hereinafter referred to simply as "inclined surface 23b") so as to gradually become higher from the proximal lower end portion 23a side toward a portion of the wall portion where the flange portion 20 is formed. In addition, a portion 23c of the wall portion 23 ranged from a highest position of the inclined surface 23b to the flange portion 20 is formed as a high wall layer which is higher than the proximal lower end portion 23a.

An engaging wing member 24 having elasticity is formed on and integrated with an outer peripheral surface of each of the pair of semicylinders 19a, 19b. One end of the engaging wing member 24 is fixed to a position near the lower end of each of the semicylinders 19a, 19b and another end of the engaging wing member 24 is formed at the upper end side of the semicylinder so as to project at some angle to the semicylinder.

Meanwhile, a female screw portion 25 is formed along an inner peripheral surface of each of the semicylinders 19a, 19b so as to be capable of engaging with the screw portion of the bolt 3.

A description will be given of the structure of the knob 11. The knob 11 is made of resin and is formed substantially in the shape of a cylinder. The nut 10 formed in the shape of a cylinder can be inserted into the knob 11 in a manner of being generally applied closely to the inner side of the knob 11. Grooves 26a, 26b are formed in the opening portion of the knob 11 and the proximal lower end portions 23a of the wall portions 23 slide in and engage the grooves 26a, 26b. Engaging openings 27 are formed at the side surface of the knob 11 respectively at positions corresponding to the engaging wing members 24 of the nut 10. Further, an inclined surface 28 is formed at an outer side of the engaging opening 27 so as to gradually approach an interior of the nut 10 in the radial direction thereof as extending from the upper portion to the intermediate portion of the engaging opening 27.

The substantially cylinder-shaped nut 10 is inserted in the knob 11 in such a manner that the striped wall portions 23 respectively correspond to the grooves 26a, 26b. The state in which the knob 11 is being assembled to the nut 10 is indicated by the one-dot chain lines in FIG. 5. In this case, since the engaging wing members 24 are each provided to be open in such a manner the upper end side thereof projects outward with the lower end side thereof fixed to the outer periphery of the semicylinder, the engaging wing members 24 are bent inward when the nut 10 is inserted in the knob 11. When a free end of the engaging wing member 24 is brought into a state of corresponding to the engaging opening 27, the end of the engaging wing member 24 is provided to project out of the engaging opening 27 due to self-return of elasticity of the engaging wing member 24. Thereafter, even if the nut 10 is about to be pulled out of the knob 11, the engaging wing member 24 is adapted to move while sliding on the inclined surface 28 and the base end of the engaging wing member 24 is engaged with the engaging opening 27. As a result, the nut 10 is prevented from being pulled out of the knob 11. Thus, the nut 10 is built in and held within the knob 11 so as not to be pulled out of the knob 11 (see FIGS. 4 and 5).

In the connecting clip 8 formed with the nut 10 being built in the knob 11, as shown in FIGS. 4 and 5, when the connecting clip 8 is set in a state in which only the proximal lower end portions 23a of the wall portions 23 are disposed within the knob 11 (which will be hereinafter referred to as "the state in which the knob 11 is disposed at a second position"), the semicylinders 19a, 19b are separated from each other by clearance σ1 (see FIG. 6) and the size of the screw hole formed in the nut 10 is set larger than the external shape of the shaft portion 3b of the bolt 3. Accordingly, the shaft portion 3b of the bolt 3 can be smoothly inserted in the nut 10.

On the other hand, when the knob 11 is moved with respect to the nut 10 until the high wall layer portions 23c of the wall portions 23 on the nut 10 are disposed within the knob 11, the connecting clip 8 is brought into a state in which the dimension of the inner diameter of the screw hole formed in the nut 10 is reduced to that corresponding to the shaft portion 3b of the bolt 3 (which will be hereinafter referred to as "the state in which the knob 11 is disposed at a first position").

The nut 9 is disposed at the lower end of the bolt 3 which projects downward from the lower side of the connecting clip 8 so as to prevent the knob 11 from being pushed down inadvertently. However, the nut 9 may not necessarily used.

A description will be hereinafter given of the procedures of mounting the seat 2 to the toilet stool 1 by using the connecting tool 4 having the above-described structure.

First, the head portion 3a is inserted in the engaging chamber 6a of the case 12 at the seat 2 side so that the seat 2 and the bolt 3 are integrated with each other, and the ring-shaped rubber washer 5 is passed through the shaft portion 3b and is disposed at the lower surface of the engaging chamber 6a, and thereafter, the shaft portion 3a of the bolt 3 is inserted in the bolt-inserting through hole 15 of the toilet stool 1.

Next, the shaft portion 3b passing through the bolt-inserting through hole 15 and projecting out of the lower side of the toilet stool 1 is arranged to pass through the rubber bush 6 and the resin washer 7. In the state in which the knob 11 is disposed at the "second position"(see FIGS. 4 and 5), the connecting clip 8 is mounted to the bolt 3 and the nut 10 is pressed on the rubber bush 6 side via the resin washer 7 until the rubber bush 6 is strongly pressed against the lower side of the toilet stool 1. Subsequently, the knob 11 is moved from the above-described "second position" to the "first position" with respect to the nut 10. As a result, the nut 10 is engaged with and positioned on the bolt 3 in a state of being screwed at a position on the bolt 3 with the knob 11 being disposed at the first position. Further, when the nut 10 is further strongly tightened, the knob 11 is rotated. As a result, the knob 11 and the nut 10 are rotated integrally because the striped wall portions 23 are connected to the grooves 26a, 26b in the rotational direction of the knob 11, and the nut 10 can be screwed into the bolt 3. Thereafter, when the nut 9 is screwed into the bolt 3, it is possible to prevent the knob 11 from being inadvertently pulled out from the "first position" to be moved to the "second position".

A description will be hereinafter given of the procedures of removing the seat 2 from the toilet stool 1. In this case, it suffices that the above-described mounting operation be carried out in a reverse order. Namely, when the nut 9 is mounted to the bolt 3, the nut 9 is first removed. Next, the knob 11 is moved from the "first position" to the "second position" with respect to the nut 10 so as to expand the nut 10, and the engagement between the screw portion 3c of the bolt 3 and the female screw portions 25 of the semicylinders 19a, 19b is accordingly released. As a result, the nut 10 together with the knob 11 can be removed from the bolt 3, and thereafter, the rubber bush 6 and the resin washer 7 are removed from the bolt 3. Accordingly, the seat 2 is released from being fixed to the toilet stool 1. When the shaft portion 3a of the bolt 3 is pulled out of the bolt-inserting through hole 15 of the toilet stool 1, the seat 2 can be removed from the toilet stool 1 together with the case 12.

Meanwhile, in the above-described embodiment, an example was described in which the nut 10 is formed from the pair of semicylinders 19a, 19b. However, the present invention is not limited to the same, and one cylinder-shaped nut may be formed in such a manner that three or more divided semicylinder sections are connected by the flexible member 18 serving as the thin-walled hinge.

In this case, in addition to the structure in which the semicylinders are formed, by resin molding, integrally with each other via the flexible members 18 each serving as a thin-walled hinge, the structure in which the semicylinders are connected to each other with a shaft being supported in a hole or with the shaft being engaged with the hole as shown in FIG. 16 can be used. Namely, in this other example of the nut 10 shown in FIG. 16, only portions of the nut 10 are altered which correspond to the flexible members 18 of the above-described first embodiment, particularly shown in FIG. 8. Projecting pieces 30, 30 are respectively formed integrally with the semicylinder 19a at the side where the semicylinder 19a is connected to the semicylinder 19b, and a shaft 30a is formed so as to project from an outer surface of each of the projecting pieces 30. Correspondingly, projecting pieces 31, 31 are respectively formed integrally with the semicylinder 19b at the side where the semicylinder 19b is connected to the projecting pieces 30, 30, and a hole 31a is formed in each of the projecting pieces 31, 31. The shafts 30a are engaged with the corresponding holes 31a, and thereafter the semicylinders 19a, 19b are folded at a position of a connecting portion 32 formed by the above-described engagement so as to be closely fit to each other to form a cylindrical configuration.

Further, in the above-described first embodiment, a structure was described in which the knob 11 serving as the operating member is shifted between the first position and the second position when it is moved along the axial direction with respect to the nut 10. However, the present invention is not so limited, and the structure in which the knob, the operating member of the present invention, is shifted between the first position and the second position by being moved in the radial direction of the nut 10 with respect to the nut 10 may be utilized. An example of this structure will be further described with reference to FIGS. 17 through 19. In the following description, the distinction between the structure shown in FIGS. 17 through 19 and that in FIGS. 1 through 15 will be clarified, and at the same time, only a principal portion of the structure in FIGS. 17 to 19 will be described in detail. Further, it should be noted that the same members as those shown in FIGS. 1 through 15 will be denoted by the same reference numerals, and a description thereof will be omitted.

A knob 33 serving as the operating member is a resinous molded body which is constructed in that knob half bodies 33a, 33b each having a semicylinder-shaped configuration are integrally formed with each other via a flexible member 34 serving as a thin-walled hinge. The knob half bodies 33a, 33b are formed in the shape of a substantially cylindrical configuration when the knob half body 33a is rotated in the direction indicated by arrow in FIG. 17 at the flexible member 34 and is connected to the knob half body 33b. Further, a pair of circular arc-shaped connecting pieces 35, 35 are formed so as to project from an end surface 134 of the knob half body 33a at a predetermined interval and at upper and lower positions along the axial direction of the knob half body 33a, and the distal end of each of the connecting pieces 35, 35 is formed as an engaging claw 35a which projects toward the side of the central axis of the knob half body 33a. Correspondingly, groove portions 37 are provided at the outer periphery of the knob half body 33b at positions corresponding to the portions covered by the connecting pieces 35. When the knob half bodies 33a, 33b are connected to each other to form the above-described substantially cylindrical configuration, the connecting pieces 35 of the knob half body 33a are respectively fitted into the groove portions 37. Further, a ratchet gear 38 is formed on the bottom surface of the groove portion 37. The engaging claw 35a can be engaged with an arbitrary tooth of the ratchet gear 38.

Meanwhile, the engaging openings 27 formed in the knob 11 in the above-described first embodiment is omitted in the knob 33, and correspondingly, the engaging wing members 24 formed in the nut 10 of the first embodiment is also omitted.

Figure 17:
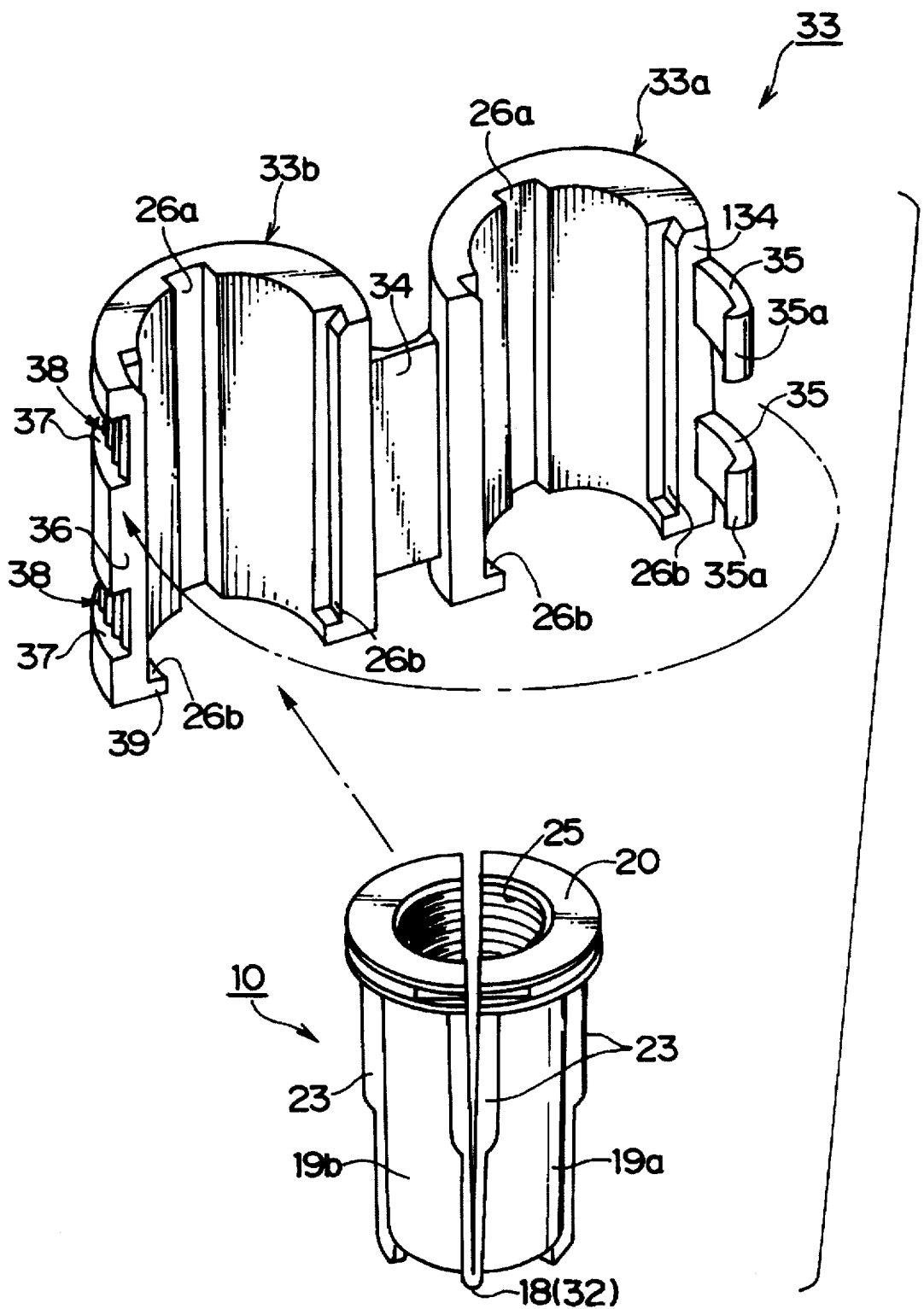
FIG. 17 is a schematically developed perspective view illustrating another example of the above-described knob together with the nut.
Figure 18:
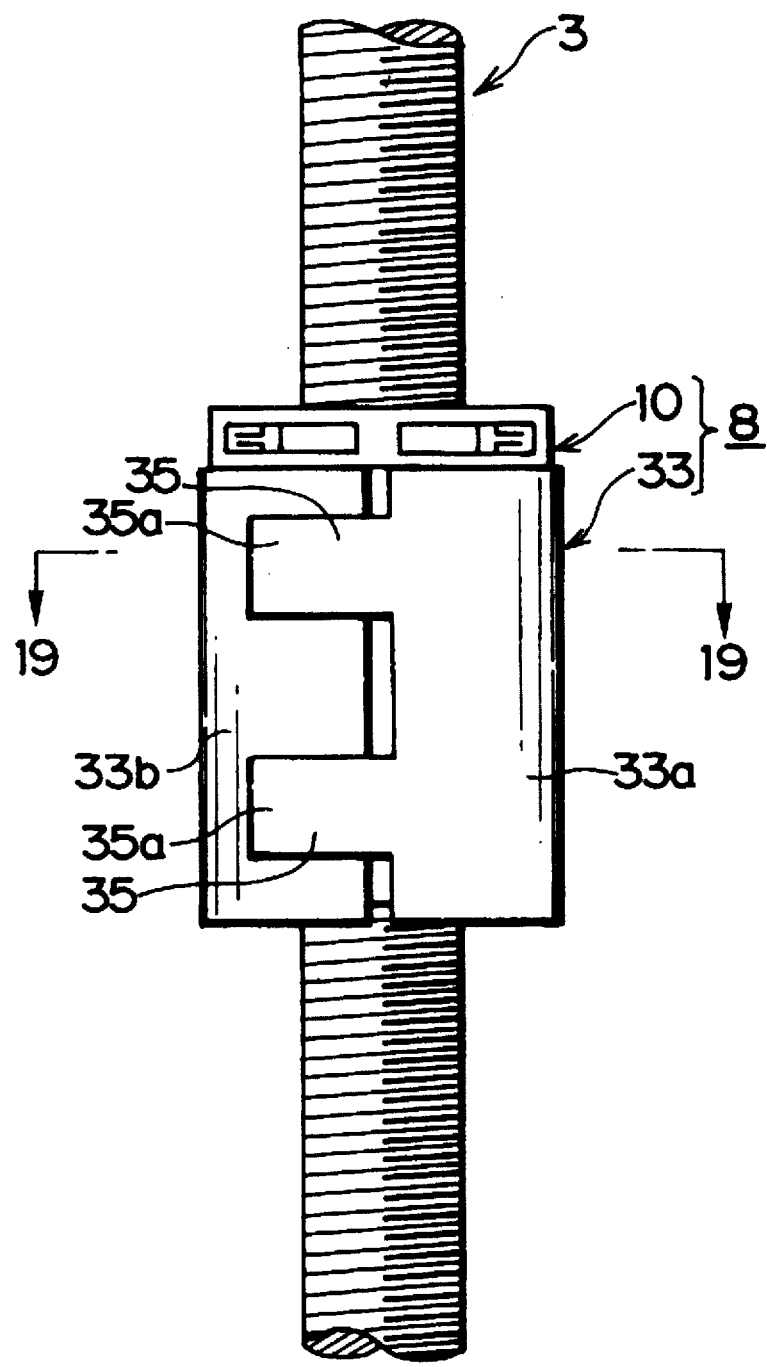
FIG. 18 is a side view illustrating a state in which the above-described another example of knob is used.
Figure 19:
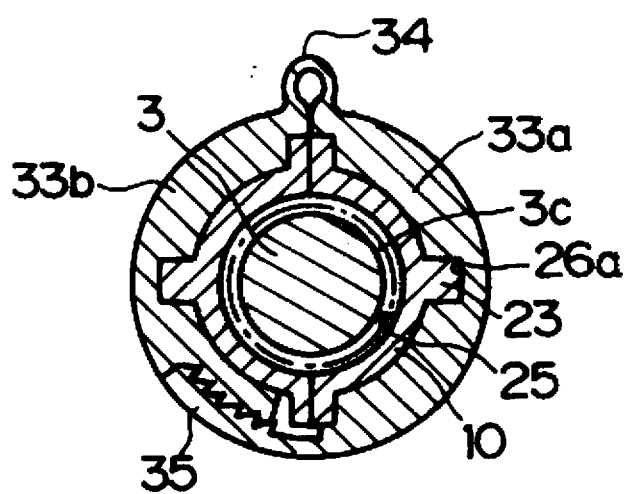
FIG. 19 is a schematic cross-sectional view taken along the lines 19—19 in FIG. 18.
Figure 20:
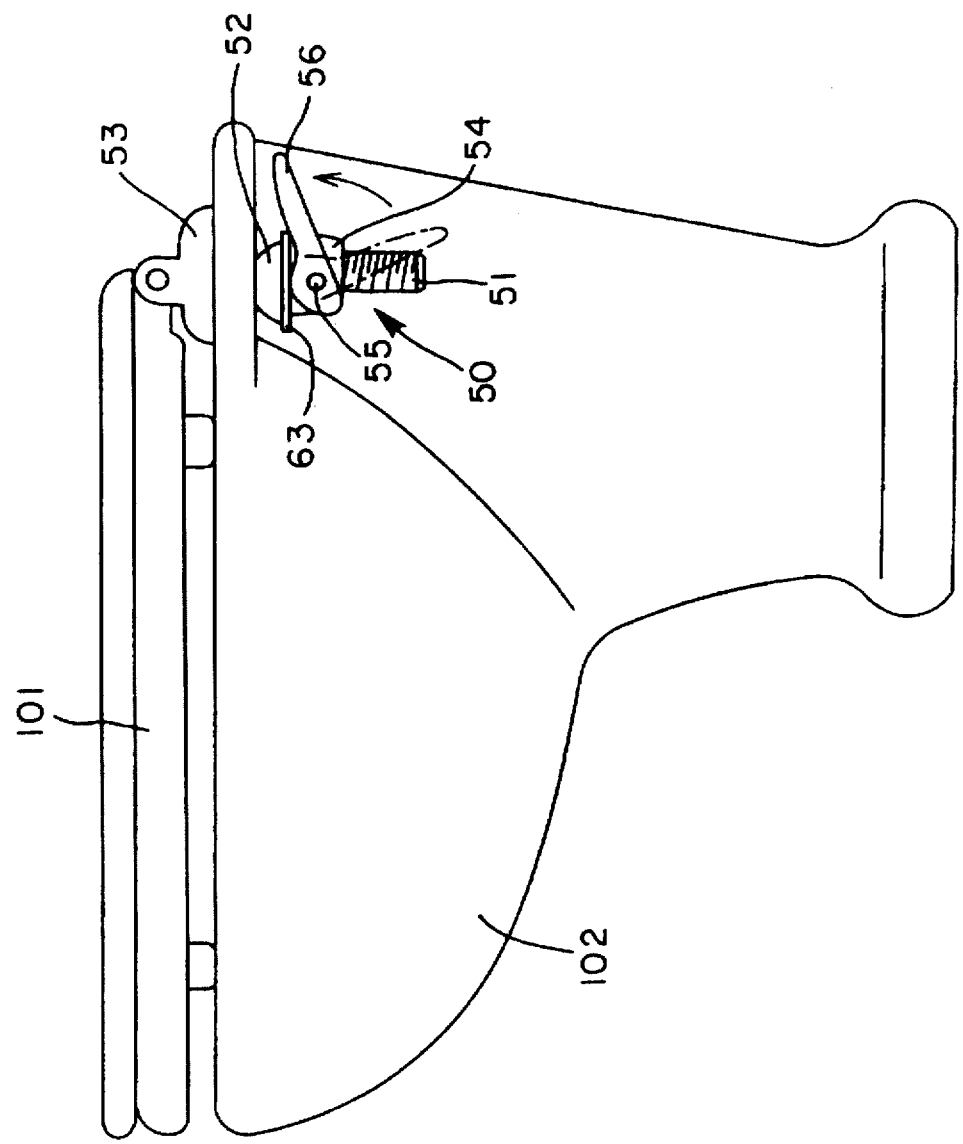
FIG. 20 is a side view illustrating a state in which a toilet seat is mounted to a conventional example of a toilet stool.
Figure 21:
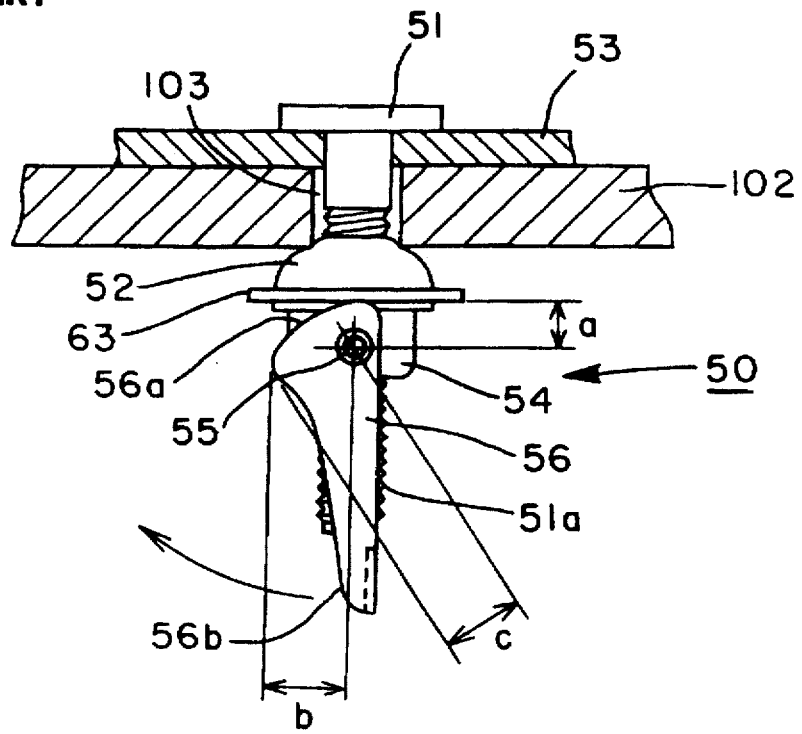
FIG. 21 is an operational explanatory view showing a state of a conventional connecting tool for a toilet seat before the tool is tightly fastened.
Figure 22:
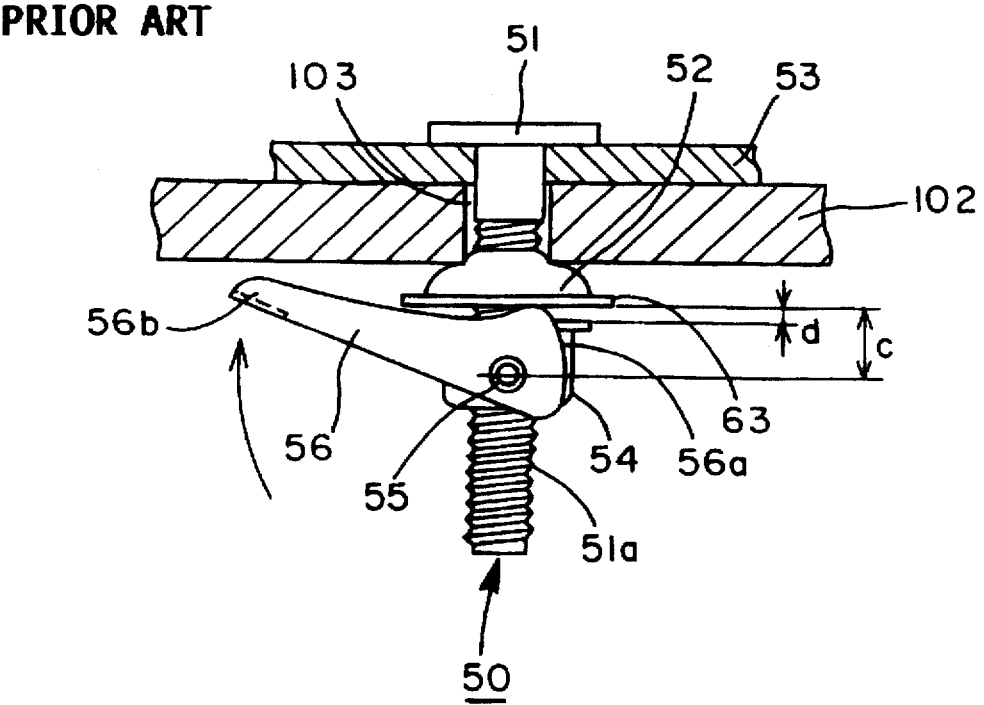
FIG. 22 is an operational explanatory view showing a state of the conventional connecting tool for a toilet seat after the tool have been tightly fastened.

When the above-described knob 33 is used, first, the outer periphery of the nut 10 excepting a flange portion 20 is provided in such a manner as to be enveloped by the knob half bodies 33a, 33b from the outer peripheral side of the nut 10, and the knob half bodies 33a, 33b are rotated relatively in the direction of arrow in FIG. 17 so as to form the substantially cylindrical configuration. Thus, the knob 33 is held in the substantially cylindrical state with the engaging claw 35a of each of the connecting pieces 35 being engaged with a tooth of the ratchet gear 38, the tooth being disposed near the end surface 36, and the knob 33 is mounted to the nut 10. In this case, when the wall portions 23 of the nut 10 are respectively provided to correspond to grooves 26a, 26b of the knob half bodies 33a, 33b, the nut 10 is positioned and further rotation thereof (i.e., further movement of the nut 10 in the axial direction thereof) is prevented. Further, as respective end surfaces 34, 36 of the knob half bodies 33a, 33b are brought close with each other, the engaging claw 35a is engaged with a tooth of the ratchet gear 38, the tooth being separated from the end surface 36, so that the knob 33 is tightly applied to and held on the nut 10. When the engaging claw 35a is engaged with a tooth of the ratchet gear 38 further separated from the end surface 36, the engaging force of the engaging claw 35a is made greater. The knob 33 is provided to shift the nut 10 from the second position to the first position due to the engagement between the engaging claws 35a and the ratchet gears 38. FIGS. 18 and 19 each show the state in which the nut 10 is moved to the first position. Namely, with the knob half bodies 33a, 33b being moved in the radial direction of the nut 10 with respect to the nut 10, specifically, when the diameter of the nut 10 is reduced by a predetermined amount due to the above-described engaging force, the nut 10 is disposed at the first position. On the other hand, when the diameter of the nut 10 is enlarged by a predetermined amount from the state at the first position, the nut 10 is shifted to the second position.

In this way, it suffices that the connecting clip of the present invention satisfies the necessary conditions described in the first aspect of the present invention, and various modifications of others can be made on the basis of the number of molding lots and concrete specifications.

What is claimed is:

1. A connecting clip for a toilet seat, comprising:
    a nut formed by a plurality of semicylinders that are connected and each having an inner peripheral surface, the inner peripheral surfaces of the semicylinders together defining a female screw portion, whereby said nut can be screwed onto a bolt, said nut including engaging members provided at a first longitudinal end of said nut to connect the plurality of semicylinders, said first longitudinal end opposing a second longitudinal end of said nut, said second longitudinal end including a connecting portion; and
    an operating member mounted on an outer periphery of said nut and provided to be engaged with said nut at a first position and a second position, wherein in the first position, the operating member is positioned with respect to the nut such that the plurality of semicylinders approach each other, toward an axial center of said nut to reduce an inner diameter of said nut, and in the second position, the operating member is positioned with respect to the nut such that the plurality of semicylinders are separated from one another, away from the axial center of said nut to enlarge the inner diameter of said nut.

2. A connecting clip for a toilet seat according to claim 1, wherein said operating member includes guide portions for guiding movement of the operating member between the first and second positions.

3. A connecting clip for a toilet seat according to claim 2, wherein the guide portions comprise a plurality of grooves provided along an axial direction of said operating member along an inner peripheral portion of said operating member.

4. A connecting clip for a toilet seat according to claim 2, wherein said nut includes striped wall portions on an outer peripheral portion of said nut, the striped wall portions being capable of engaging with the guide portions.

5. A connecting clip for a toilet seat according to claim 1, wherein said connecting portion comprises a thin-walled hinge formed by a flexible member, the thin-walled hinge being provided to connect the plurality of semicylinders.

6. A connecting clip for a toilet seat according to claim 1, wherein said operating member is provided so as to cover at least a portion of said nut.

7. A connecting clip for a toilet seat according to claim 1, wherein said operating member is shifted between the first position and the second position by sliding said operating member along an axial direction of the operating member.

8. A connecting clip for a toilet seat according to claim 1, wherein said nut includes an operating member-stopping member, on an outer periphery thereof, for blocking movement of said operating member.

9. A connecting clip for a toilet seat according to claim 8, wherein said operating member includes an engaging hole which engages with the operating member-stopping member.

10. A connecting clip for a toilet seat according to claim 1, wherein said connecting portion includes a plurality of shafts, each connecting the semicylinders to each other.

11. A connecting clip for a toilet seat according to claim 1, wherein said operating member is shifted between the first position and the second position by moving in a radial direction of said operating member.

12. A connecting clip for a toilet seat, comprising:
    a nut formed by a plurality of semicylinders that are connected and each having an inner peripheral surface, inner peripheral surfaces of the semicylinders together defining a female screw portion, whereby said nut can be screwed onto a bolt, said nut including engaging members provided at a first longitudinal end of said nut to connect the plurality of semicylinders, said first longitudinal end opposing a second longitudinal end of said nut, said second longitudinal end including a connecting portion; and
    an operating member mounted so as to cover at least a portion of an outer periphery of said nut and provided to be shifted between a first position and a second position by moving slidingly along an axial direction of said operating member, wherein in the first position, the operating member is positioned with respect to the nut such that the plurality of semicylinders approach each other, toward an axial center of said nut to reduce an inner diameter of said nut, and in the second position, the operating member is positioned with respect to the nut such that the plurality of semicylinders are separated from one another, away from the axial center of said nut to enlarge the inner diameter of said nut.

13. A connecting clip for a toilet seat according to claim 12, wherein said operating member includes guide portions for guiding movement of the operating member between the first and second positions.

14. A connecting clip for a toilet seat according to claim 13, wherein the guide portions comprise a plurality of grooves provided along an axial direction of said operating member along an inner peripheral portion of said operating member.

15. A connecting clip for a toilet seat according to claim 13, wherein said nut includes striped wall portions on an outer peripheral portion of said nut, the striped wall portions being capable of engaging with the guide portions.

16. A connecting clip for a toilet seat according to claim 15, wherein the striped wall portions each have a high wall portion and a low wall portion, wherein a distance between the axial center of said nut and an outermost position of the high wall portion is greater than that between the axial center of said nut and an outermost position of the low wall portion, the low wall portion extending in a vicinity of the connecting portion of the plurality of semicylinders, and when said operating member is disposed at the first position, the high wall portion is engaged with said operating member.

17. A connecting clip for a toilet seat according to claim 12, wherein the engaging members each include an engaging claw and an engaging hole, and when the engaging claw and the engaging hole each other, spacing between the plurality of semicylinders can be varied.

18. A connecting clip for a toilet seat according to claim 12, wherein said nut includes an operating member-stopping member, on an outer periphery thereof, for blocking movement of said operating member.

19. A connecting clip for a toilet seat according to claim 18, wherein said operating member includes an engaging hole which engages with the operating member-stopping member.

20. A connecting clip for a toilet seat according to claim 19, wherein one end of the operating member-stopping member is fixed to an outer periphery of a respective semicylinder and in a vicinity of a lower end portion of the semicylinder, and the operating member-stopping member projects outwardly from the semicylinder.

21. A connecting clip for a toilet seat according to claim 12, wherein said connecting portion comprises a thin-walled hinge formed by a flexible member, the thin-walled hinge being provided to connect the plurality of semicylinders.

22. A connecting clip for a toilet seat according to claim 12, wherein said connecting portion includes a plurality of shafts each connecting the semicylinders to each other.

23. A connecting clip for a toilet seat, comprising:

a nut formed by a plurality of semicylinders that are connected and each having an inner peripheral surface, the inner peripheral surfaces of the semicylinders together defining a female screw portion, whereby said nut can be screwed onto a bolt, said nut including engaging members provided at a first longitudinal end of said nut to connect the plurality of semicylinders, the first longitudinal end opposing a second longitudinal end of said nut, said second longitudinal end including a connecting portion; and an operating member mounted on an outer periphery of said nut and provided to be shifted between a first position and a second position by moving in a radial direction of said operating member, wherein in the first position, the operating member is positioned with respect to the nut such that the plurality of semicylinders approach each other, toward an axial center of said nut to reduce an inner diameter of said nut, and in the second position, the operating member is positioned with respect to the nut such that the plurality of semicylinders are separated from one another, away from the axial center of said nut to enlarge the inner diameter of said nut.

24. A connecting clip for a toilet seat according to claim 23, wherein said operating member includes guide portions for guiding movement of the operating member between the first and second positions.

25. A connecting clip for a toilet seat according to claim 24, wherein the guide portions comprise a plurality of grooves provided along an axial direction of said operating member along an inner peripheral portion of said operating member.

26. A connecting clip for a toilet seat according to claim 24, wherein said nut includes striped wall portions on an outer peripheral portion of said nut, the striped wall portions being capable of engaging with the guide portions.

27. A connecting clip for a toilet seat according to claim 26, wherein the striped wall portions each have a high wall portion and a low wall portion, wherein a distance between the axial center of said nut and an outermost position of the high wall portion is greater than that between the axial center of said nut and an outermost position of the low wall portion, the low wall portion extending in a vicinity of the connecting portion of the plurality of semicylinders, and when said operating member is disposed at the first position, the high wall portion is engaged with said operating member.

28. A connecting clip for a toilet seat according to claim 23, wherein the engaging members each include an engaging claw and an engaging hole, and when the engaging claw and the engaging hole are engage each other, a spacing between the plurality of semicylinders can be varied.

29. A connecting clip for a toilet seat according to claim 23, wherein said nut includes an operating member-stopping member, on an outer periphery thereof, for blocking movement of said operating member.

30. A connecting clip for a toilet seat according to claim 23, wherein said connecting portion comprises a thin-walled hinge formed by a flexible member, the thin-walled hinge being provided to connect the plurality of semicylinders.

31. A connecting clip for a toilet seat according to claim 23, wherein said operating member is shifted between the first position and the second position by moving in a radial direction of said operating member.

* * * * *